United States Patent Office 3,527,822
Patented Sept. 8, 1970

3,527,822
DIVINYLBENZENE POLYMERIZATION INHIBITORS
Herbert L. Benson, Jr., Houston, Tex., assignor to Shell Oil Company, New York, N.Y., a corporation of Delaware
No Drawing. Filed Apr. 16, 1969, Ser. No. 816,791
Int. Cl. C07c 7/08, 7/18; B01d 3/34
U.S. Cl. 260—666.5                                6 Claims

ABSTRACT OF THE DISCLOSURE

Certain nitroso derivatives of phenol and naphthol effectively inhibit divinylbenzene polymerization at elevated temperatures in the absence of oxygen (air) and permit the separation and purification of divinylbenzene by vacuum distillation.

BACKGROUND OF THE INVENTION

Divinylbenzene is an important compound, finding commercial utility as a cross-linking agent in the polymerization of styrene and copolymers of styrene. Morever, it can be copolymerized with various other monomers, such as chlorostyrene, butadiene, isoprene, cyclopentadiene, methyl methacrylate, vinyl acetate and other vinyl derivatives to yield polymers with properties differing from the homo-polymers of these compounds.

It is known that divinylbenzene polymerizes readily. This polymerization is further characterized in liquid mixtures which contain divinylbenzene as a major constituent by the formation of a partial or complete gel following the polymerization of but a minor part of the divinylbenzene. For example, a 95% solution of divinylbenzene gels when about 2 to 3% of the divinylbenzene has polymerized. This gel is insoluble in common organic solvents.

Certain divinylbenzene polymerization inhibitor compounds are known. 4-tert-butylcatechol and hydroquinone are the most generally accepted inhibitors. These inhibitors are effective only in the presence of oxygen. U.S. 2,445,941 issued July 27, 1948 to Dreisbach describes the use of from about 0.5% to about 1% of 2,4-dichloro-6-nitrophenol as a divinylbenzene polymerization inhibitor in the relative absence of oxygen but requires that large amounts of steam be present. This patent emphasizes the greater polymerization sensitivity of divinylbenzene compared to styrene.

The need for divinylbenzene polymerization inhibitors which are effective in the absence of air becomes critical in the separation and purification of divinylbenzene. Divinylbenzene is generally produced by the dehydrogenation of a mixture of the isomers of diethylbenzene. Often, this reaction is iodinatively effected. Reaction products generally contain a mixture of divinylbenzene, ethylvinylbenzene, unreacted diethylbenzene, a small quantity of naphthalene, and some impurities.

Vacuum distillation is a preferred method for separation of unstable organic liquid mixtures. This general method, however, has heretofore been unsuitable for separation of mixtures containing divinylbenzene, such as, for example, the reaction mixture described above, since the partial pressure of oxygen in a vacuum distillation column is too low for conventional polymerization inhibitors to be effective. Vacuum distillation, as a means of purifying divinylbenzene is therefore rendered impractical due to divinylbenzene polymerization, gel formation and column plugging. Distillation at atmospheric pressure requires distillation kettle temperatures which are too high to be practical. Operating a vacuum distillation column with an added-oxygen atmosphere is impractical, hazardous, and results in sizable production of by-products.

One method for purification of divinylbenzene is described in U.S. 3,217,052 issued Nov. 9, 1965 to Meek et al., wherein separation is effected by forming a solid complex of divinylbenzene with monovalent copper or silver, separating this solid complex, and then decomposing this complex. This process is illustrative of the cumbersome and costly methods presently used to effect divinylbenzene separation and purification. Clearly, simple vacuum distillation, which would be made possible by the discovery of polymerization inhibitors effective in the absence of air, would be preferable.

STATEMENT OF THE INVENTION

In accordance with the present invention, polymerization of divinylbenzene is inhibited in the relative absence of oxygen with substantially improved efficiency by the use of selected nitroso derivatives of phenol and naphthol as inhibitors. Inhibition of divinylbenzene polymerization by the compounds of this invention considerably minimizes many of the disadvantages generally inherent in divinylbenzene polymerization inhibitors used heretofore. Inhibitor compounds of the present invention, because of their ability to substantially retain efficiency in the absence of oxygen, permit the use of vacuum distillation to effect separation and purification of divinylbenzene.

DETAILED DESCRIPTION OF THE INVENTION

Amino and nitroso derivatives of phenol and naphthol generally have some inhibiting effects on divinylbenzene polymerization. Generally, however, they are little, if any, more effective than conventional inhibitors in the absence of oxygen. In accordance with the present invention, four nitroso derivatives of phenol and naphthol have been found which are markedly more effective than conventional inhibitors and other nitroso and amino compounds in the relative absence of oxygen. These preferred inhibitors are 5-methyl-4-nitroso-2-isopropylphenol (MNIP), 1-nitroso-2-naphthol (1N2N), 2 - nitroso - 1 - naphthol (2N1N) and 5- methoxy-2-nitrosophenol (MNP). Among these inhibitors, 5-methyl-4-nitroso-2-isopropylphenol, 1-nitroso-2-naphthol and 2-nitroso-1-naphthol are preferred. A most preferred inhibitor is 5-methyl-4-nitroso-2-isopropylphenol.

The amount of polymerization inhibitor added can vary widely. Generally, the degree of stabilization is proportional to the amount of inhibitor added. Inhibitor concentrations between about 0.03 gram per 1000 grams of divinylbenzene and 5 grams per 1000 grams of divinylbenzene have generally proven suitable, depending on the temperature of the divinylbenzene and the degree of inhibition desired.

During vacuum distillation of divinylbenzene-containing mixtures, the temperature of the reboiler is preferably maintained at from about 185° F. to about 215° F. by controlling reboiler pressure at from about 15 mm. to about 40 mm. of Hg. Under such conditions, inhibitor concentrations from about 0.1 gram to about 1 gram/1000 g. divinylbenzene are suitable with concentrations of from about 0.2 to about 0.5 g./1000 g. divinylbenzene being preferred.

The inhibitors according to the invention are effective in all concentrations of divinylbenzene.

The following examples are provided to further illustrate the use of the inhibitors according to this invention.

Example 1

This example illustrates the relative effectiveness of the inhibitors according to the invention at low oxygen concentrations. It also illustrates the relative ineffectiveness of conventional inhibitors, and nitrogen-containing inhibitors not according to the invention at low oxygen concentrations.

Samples of a feedstock comprising about 95% wt. divinylbenzene (DVB), about 4.5% wt. ethylvinylbenzene, and about 0.5% wt. naphthalene containing various concentrations of conventional inhibitors, inhibitors according to the invention, and other nitrogen-containing inhibitors were maintained at 160° F. in the presence of varying amounts of oxygen (air). The length of time required to effect gelling of the mixtures (gel time) was measured. Data shown in Table I indicate that with access to large amounts of air, inhibitors according to the invention offer no marked advantage over conventional inhibitors. However, when air availability is cut to one tenth its original value, inhibitors according to the invention are markedly superior to conventional inhibitors. Other nitrogen-containing inhibitors fail to sustain inhibition activity in the absence of oxygen (air).

TABLE I

| Inhibitor | High Oxygen, Air/Divinylbenzene, V/V = 0.6 35–40% V Air | | | Low Oxygen, Air/DVB, V/V = 0.06 56% V Air | | |
|---|---|---|---|---|---|---|
| | Inhibitor conc., p.p.m. wt. | Gel time, hours | Relative gel time [1] | Inhibitor conc., p.p.m. wt. | Gel times, hours | Relative gel time [1] |
| None | 0 | 3.5 | 13 | 0 | 3.0 | 29 |
| 4-tert-butylcatechol (TBC) | 1,100 | 27 | (100) | 1,000 | 10.5 | (100) |
| Hydroquinone | 1,000 | 18 | 67 | 950 | 7.5 | 71 |
| 5-methoxy-2-nitrosophenol (MNP) | 1,100 | 25 | 93 | 1,000 | 22.5 | 215 |
| 1-nitroso-2-naphthol (1N2N) | | | | 1,000 | 27 | 258 |
| 2-nitroso-1-naphthol (2N1N) | | | | 1,000 | 28 | 267 |
| 5-methyl-4-nitroso-2-isopropylphenol (MNIP) | | | | 1,000 | 43 | 410 |
| 4-aminophenol | 1,400 | 2.5 | 93 | 1,100 | 12.5 | 119 |
| 4-amino-3-methylphenol | 1,100 | 24 | 89 | 1,050 | 12.5 | 119 |
| 5-amino-1-naphthol | 1,100 | 20 | 74 | 950 | 9 | 86 |

[1] Assume (TBC) = 100; all runs made at 160° ± 0.1° F.

Example 2

This example illustrates the effect (on gel time) of increasing the amount of inhibitor and also illustrates the effectiveness of the inhibitors according to the invention in a nitrogen atmosphere. Samples were prepared as in Example 1 with varying amounts of 4-tert-butyl-catechol and 1-nitroso-2-naphthol and heated at 205° F. The gel time results are shown in Table 2.

TABLE 2

| Inhibitor Conc., p.p.m. (wt.) | | DVB Gel Time at ~205° F., Min. | |
|---|---|---|---|
| TBC | 1N2N | 25% v Air | $N_2$-Blanketed |
| 0 | 0 | 11 | 11 |
| 333 | 0 | 33 | 25 |
| 500 | 0 | 43 | 28 |
| 667 | 0 | 44 | 28 |
| 1,000 | 0 | 54 | 33 |
| 0 | 250 | 52 | 56 |
| 0 | 333 | 61 | 64 |
| 0 | 500 | 79 | 78 |
| 0 | 667 | 102 | 101 |

Example 3

This example illustrates the effect of temperature on the relative effectiveness of the inhibitors according to the invention. To the samples of the feedstock of Example 1 were added 1000 p.p.m. of 4-tert-butylcatechol and the inhibitors according to the invention. The samples were saturated with air and then sealed with essentially no air cap. Relative gel times were measured (TBC inhibitor = 1.0) at various temperatures. As the data in Table 3 shows, as the temperature is raised, the inhibitors according to the invention become increasingly superior.

TABLE 3

| Inhibitor | Relative gel time | | |
|---|---|---|---|
| | Temp. (160° F.) | Temp. (190° F.) | Temp. (205° F.) |
| 4-tert-butylcatechol (TBC) | 1.0 | 1.0 | 1.0 |
| 5-methoxy-2-nitrosophenol (MNP) | 2.1 | | |
| 1-nitroso-2-naphthol (1N2N) | 2.6 | 2.7 | 3.3 |
| 2-nitroso-1-naphthol (2N1N) | 2.7 | 3.2 | |
| 5-methyl-4-nitroso-2-iospropyl-phenol (MNIP) | 4.1 | 5.1 | |

Example 4

This example illustrates the use of the inhibitors according to the invention to make possible the separation and purification of divinylbenzene by distillation.

An 8-inch diameter x 30 feet long distillation column was packed with Goodloe packing. Column feedstock comprised about 85% wt. divinylbenzene, about 5% wt. ethylvinylbenzene, and about 10% wt. naphthalene and other impurities. About 50,000 lbs. of this feed were charged to the center of this column at a rate of about 50 lbs. per hour. Divinylbenzene and naphthalene were taken off as a bottom product at a rate of about 40 lbs./hour. Reflux rate was about 20 lbs./hour. The columns were operated at a kettle temperature of about 195° F., and a kettle pressure of about 20 mm. Hg. The divinylbenzene-naphthalene bottom product was then fed at a rate of about 30 lbs./hour to a second column of similar design operating at a similar pressure, where 95% purity divinylbenzene was taken overhead at a rate of about 20 lbs./hour. Reflux rate was about 25 lbs./hour. The four inhibitors according to the invention were each tested, one at a time. 250 p.p.m. wt. of inhibitor was added to the feed to the first column and was present in the feeds to the second column. There was no evidence of plugging or gelling or pressure drop across the columns during vacuum distillation. At the completion of the experiment, the columns were disassembled; except for some minor deposits around a gas lift nitrogen jet in the bottom of one reboiler, there was no evidence of polymer buildup. In a similar experiment using a 3-inch diameter by 14-foot long distillation column, wherein 4-tert-butylcatechol was used as inhibitor, polymer formation and gelling was such as to necessitate shutdowns and periodic air-burns to keep the column clear.

I claim as my invention:

1. The method of inhibiting the polymerization of divinylbenzene which comprises mixing with the divinylbenzene a minor but effective proportion of inhibitor compound selected from the group consisting of 5-methyl-4-nitroso-2-isopropylphenol, 1-nitroso-2-naphthol, 2-nitroso-1-naphthol, and 5-methoxy-2-nitrosophenol.

2. The method in accordance with claim 1 wherein from about 0.03 g. to about 5 g. of inhibitor is used per 1000 grams of divinylbenzene.

3. The method in accordance with claim 2 wherein said inhibitor comprises 5-methyl-4-nitroso-2-isopropylphenol.

4. The process for the separation of divinylbenzene in a substantially pure state from a mixture comprising divinylbenzene and ethylvinylbenzene which comprises admixing with said mixture a minor but effective proportion of an inhibitor selected from the group consisting of 5 - methyl - 4 - nitroso - 2- isopropylphenol, 1 - nitroso-2-naphthol, 2-nitroso-1-naphthol, and 5-methoxy-2-nitrosophenol, and then subjecting this admixture to vacuum distillation, thereby separating a liquid fraction consisting essentially of divinylbenzene from a vapor fraction comprising divinylbenzene and ethylvinylbenzene.

5. The process in accordance with claim 4 wherein from about 0.03 g. to about 5 g. of inhibitor is used per 1000 grams of divinylbenzene.

6. The process in accordance with claim 5 wherein said distillation is carried out at an absolute kettle pressure of from about 15 mm. to about 40 mm.

References Cited

UNITED STATES PATENTS

| | | | |
|---|---|---|---|
| 2,150,683 | 3/1939 | Hickman | 203—6 |
| 2,221,692 | 11/1940 | Hickman et al. | 203—6 |
| 2,362,052 | 11/1944 | Craig | 203—6 |
| 2,445,941 | 7/1948 | Dreisbach | 260—666.5 X |
| 2,733,281 | 1/1956 | Dreisbach et al. | 260—669 |
| 2,888,386 | 5/1959 | Brower | 203—9 |
| 3,004,042 | 10/1961 | Coppinger | 260—396 |
| 3,217,052 | 11/1965 | Meek et al. | 260—669 |
| 3,426,063 | 2/1969 | Gros | 260—666.5 |

DELBERT E. GANTZ, Primary Examiner

G. E. SCHMITKONS, Assistant Examiner

U.S. Cl. X.R.

203—9; 208—48; 252—397, 399; 260—669, 681.5